US012743459B2

(12) United States Patent
Talwar et al.

(10) Patent No.: US 12,743,459 B2
(45) Date of Patent: Sep. 22, 2026

(54) METHOD AND SYSTEM FOR OPTIMIZING A CHUNK SIZE FOR A LARGE LANGUAGE MODEL

(71) Applicant: JPMorgan Chase Bank, N.A., New York, NY (US)

(72) Inventors: Sidharth Talwar, Greater Noida (IN); Vipin Agarwal, Bangalore (IN); Indu Indiramani, Bangalore (IN); Sanjay Saran Garg, Bangalore (IN); Ranjit Radhakrishnan, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/039,091

(22) Filed: Jan. 28, 2025

(65) Prior Publication Data

US 2026/0170041 A1 Jun. 18, 2026

(30) Foreign Application Priority Data

Dec. 16, 2024 (IN) ............................ 202411099534

(51) Int. Cl.
*G06F 16/35* (2025.01)
*G06F 16/31* (2019.01)

(52) U.S. Cl.
CPC ............ *G06F 16/35* (2019.01); *G06F 16/316* (2019.01)

(58) Field of Classification Search
CPC ............................... G06F 16/35; G06F 16/316
See application file for complete search history.

(56) References Cited

U.S. PATENT DOCUMENTS

2024/0202093 A1* 6/2024 Samudrala .......... G06F 11/0754
2024/0289609 A1* 8/2024 Birru ......................... G06N 3/08
2025/0086735 A1* 3/2025 Vedula ................... G06Q 50/18
2025/0110707 A1* 4/2025 Gao .......................... G06F 8/35
2025/0147928 A1* 5/2025 Thomas ................ G06F 16/116
2025/0322259 A1* 10/2025 Zadeh .................. G06N 3/0985

* cited by examiner

*Primary Examiner* — Courtney Harmon
(74) *Attorney, Agent, or Firm* — GREENBLUM & BERNSTEIN, P.L.C.

(57) ABSTRACT

A method and system for optimizing a chunk size for a large language model (LLM) are disclosed. The method includes receiving at least one from among a set of input data and a set of evaluation metrics for evaluating LLM performance. Next, the method includes segmenting the set of input data into a plurality of chunks of a set of predefined chunk sizes. Next, the method includes processing each of the chunks of data through the LLM to generate corresponding outputs. Next, the method includes calculating a comprehensive response quality index (CRQI) for each of the chunks based on the generated corresponding outputs, wherein the CRQI is calculated as weighted combination of the evaluation metrics. Thereafter, the method includes determining an optimal chunk from among the chunks based on the calculated CRQIs, wherein the chunk with largest value of the CRQI is determined as the optimal chunk.

15 Claims, 6 Drawing Sheets

METHOD AND SYSTEM FOR OPTIMIZING A CHUNK SIZE FOR A LARGE LANGUAGE MODEL

CROSS-REFERENCE TO RELATED APPLICATIONS

This application claims priority benefit from Indian Application No. 202411099534, filed on Dec. 16, 2024 in the India Patent Office, which is hereby incorporated by reference in its entirety.

FIELD OF THE DISCLOSURE

This technology generally relates to the field of trained models/natural language processing (NLP), and more particularly to methods and systems for optimizing a chunk size for a large language model (LLM).

Background Information

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as admission of the prior art.

As is generally known, large language models (LLMs) are trained on massive datasets in order to provide the most accurate output. Before training an LLM, the datasets are first broken down into smaller chunk sizes before inputting the datasets into the LLM. Each chunk size becomes a unit of information that is vectorized and stored in a database, shaping the accuracy and effectiveness of LLMs. Although LLMs are able to generate accurate outputs, these LLMs often suffer from a problem called hallucination. Hallucination in LLMs is the concept where the LLMs generate wrong outputs in the form of errors caused by a variety of factors, including insufficient chunk size, or irrelevant chunk size, biases in the data used to train the model, etc. In order to resolve the issues of hallucination, retrieval augmented generation (RAG) was introduced.

In a RAG implementation, the user manually identifies and retrieves from the vector database the most relevant chunk size before inputting the data into the large language models (LLMs) to generate an accurate output. This manual identification and retrieval of the most relevant chunk size from the vector database is time consuming and is prone to errors and conflicts. Furthermore, if the user inputs a smaller chunk size of only 10 characters in the LLM, then the output response of LLM will be less accurate. Similarly, if the user inputs a chunk size of 1000 characters, even in that case the output response will again be less accurate. Currently no approach exists to automatically identify and retrieve the most relevant and optimal chunk size during data preparation and model training phases in RAG implementations of LLM use cases.

Hence, in view of these and other existing limitations, there arises an imperative need to provide an efficient solution to overcome the above-mentioned limitations and to provide a method and system for optimizing a chunk size for a large language model (LLM).

SUMMARY

The present disclosure, through one or more of its various aspects, embodiments, and/or specific features or sub-components, provides, inter alia, various systems, servers, devices, methods, media, programs, and platforms for optimizing a chunk size for a large language model (LLM).

According to an aspect of the present disclosure, a method for optimizing a chunk size for a large language model (LLM) is disclosed. The method is implemented by at least one processor. The method includes receiving, by the at least one processor from an entity, at least one from among a set of input data and a set of evaluation metrics for evaluating a performance of the LLM. Next, the method includes segmenting, by the at least one processor, the set of input data into a plurality of chunks of a set of predefined chunk sizes. Next, the method includes processing, by the at least one processor, each of the plurality of chunks of data through the LLM to generate corresponding outputs. Next, the method includes calculating, by the at least one processor, a respective comprehensive response quality index (CRQI) for each of the plurality of chunks based on the generated corresponding outputs, wherein each respective CRQI is calculated as a weighted combination of the set of evaluation metrics. Thereafter, the method includes determining, by the at least one processor, an optimal chunk from among the plurality of chunks based on each respective calculated CRQI, wherein the respective chunk that is associated with a largest value of the CRQI is determined as the optimal chunk.

In accordance with an exemplary embodiment, the method may further include displaying, by the at least one processor, the optimal chunk on a display unit.

In accordance with an exemplary embodiment, the set of predefined chunk sizes may include a range of token sizes, the range of token sizes including 256 tokens, 512 tokens, 1024 tokens, and 2048 tokens.

In accordance with an exemplary embodiment, the set of evaluation metrics may include at least one from among an accuracy metric, a robustness metric, a coherence and consistency metric, a response time metric, a faithfulness metric, and a factuality metric.

In accordance with an exemplary embodiment, a weightage assigned to the set of evaluation metrics may be adjustable based on at least one from among a set of user preferences and a set of predefined criteria.

In accordance with an exemplary embodiment, each metric included in the set of evaluation metrics may be normalized to a score between zero (0) and one (1) for the calculating of the CRQI.

According to another aspect of the present disclosure, a computing device configured to implement an execution of a method for optimizing a chunk size for a large language model (LLM) is disclosed. The computing device includes a processor; a memory; and a communication interface coupled to each of the processor and the memory. The processor may be configured to receive, from an entity, at least one from among a set of input data and a set of evaluation metrics for evaluating a performance of the LLM. Next, the processor may be configured to segment the set of input data into a plurality of chunks of a set of predefined chunk sizes. Next, the processor may be configured to process each of the plurality of chunks of data through the LLM to generate corresponding outputs. Next, the processor may be configured to calculate a respective comprehensive response quality index (CRQI) for each of the plurality of chunks based on the generated corresponding outputs, wherein each respective CRQI is calculated as a weighted combination of the set of evaluation metrics. Thereafter, the processor may be configured to determine an optimal chunk from among the plurality of chunks based on each respective calculated CRQI, wherein the respective chunk that is associated with a largest value of the CRQI is determined as the optimal chunk.

In accordance with an exemplary embodiment, the at least one processor may be further configured to display the optimal chunk on a display unit.

In accordance with an exemplary embodiment, the set of predefined chunk sizes may include a range of token sizes, the range of token sizes including 256 tokens, 512 tokens, 1024 tokens, and 2048 tokens.

In accordance with an exemplary embodiment, the set of evaluation metrics may include at least one from among an accuracy metric, a robustness metric, a coherence and consistency metric, a response time metric, a faithfulness metric, and a factuality metric.

In accordance with an exemplary embodiment, a weightage assigned to the set of evaluation metrics may be adjustable based on at least one from among a set of user preferences and a set of predefined criteria.

In accordance with an exemplary embodiment, each respective metric included in the set of evaluation metrics may be normalized to a score between zero (0) and one (1) for the calculation of the CRQI.

According to yet another aspect of the present disclosure, a non-transitory computer-readable storage medium storing instructions for optimizing a chunk size for a large language model (LLM) is disclosed. The instructions include executable code which, when executed by a processor, may cause the processor to receive, from an entity, at least one from among a set of input data and a set of evaluation metrics for evaluating a performance of the LLM. The instructions include executable code which, when executed by a processor, may cause the processor to segment the set of input data into a plurality of chunks of a set of predefined chunk sizes. The instructions include executable code which, when executed by a processor, may cause the processor to process each of the plurality of chunks of data through the LLM to generate corresponding outputs. The instructions include executable code which, when executed by a processor, may cause the processor to calculate a respective comprehensive response quality index (CRQI) for each of the plurality of chunks based on the generated corresponding outputs, wherein each respective CRQI is calculated as a weighted combination of the set of evaluation metrics. The instructions include executable code which, when executed by a processor, may cause the processor to determine an optimal chunk from among the plurality of chunks based on each respective calculated CRQI, wherein the respective chunk that is associated with a largest value of the CRQI is determined as the optimal chunk.

In accordance with an exemplary embodiment, the instructions may further include executable code which, when executed by the processor, may cause the processor to display the optimal chunk on a display unit.

In accordance with an exemplary embodiment, the set of predefined chunk sizes may include a range of token sizes, the range of token sizes including 256 tokens, 512 tokens, 1024 tokens, and 2048 tokens.

In accordance with an exemplary embodiment, the set of evaluation metrics may include at least one from among an accuracy metric, a robustness metric, a coherence and consistency metric, a response time metric, a faithfulness metric, and a factuality metric.

In accordance with an exemplary embodiment, a weightage assigned to the set of evaluation metrics may be adjustable based on at least one from among a set of user preferences and a set of predefined criteria.

In accordance with an exemplary embodiment, each metric included in the set of evaluation metrics may be normalized to a score between zero (0) and one (1) for the calculation of the CRQI.

BRIEF DESCRIPTION OF THE DRAWINGS

The present disclosure is further described in the detailed description which follows, about the noted plurality of drawings, by way of non-limiting examples of exemplary embodiments of the present disclosure, in which characters represent like elements throughout the several views of the drawings.

DETAILED DESCRIPTION

Figure 1:
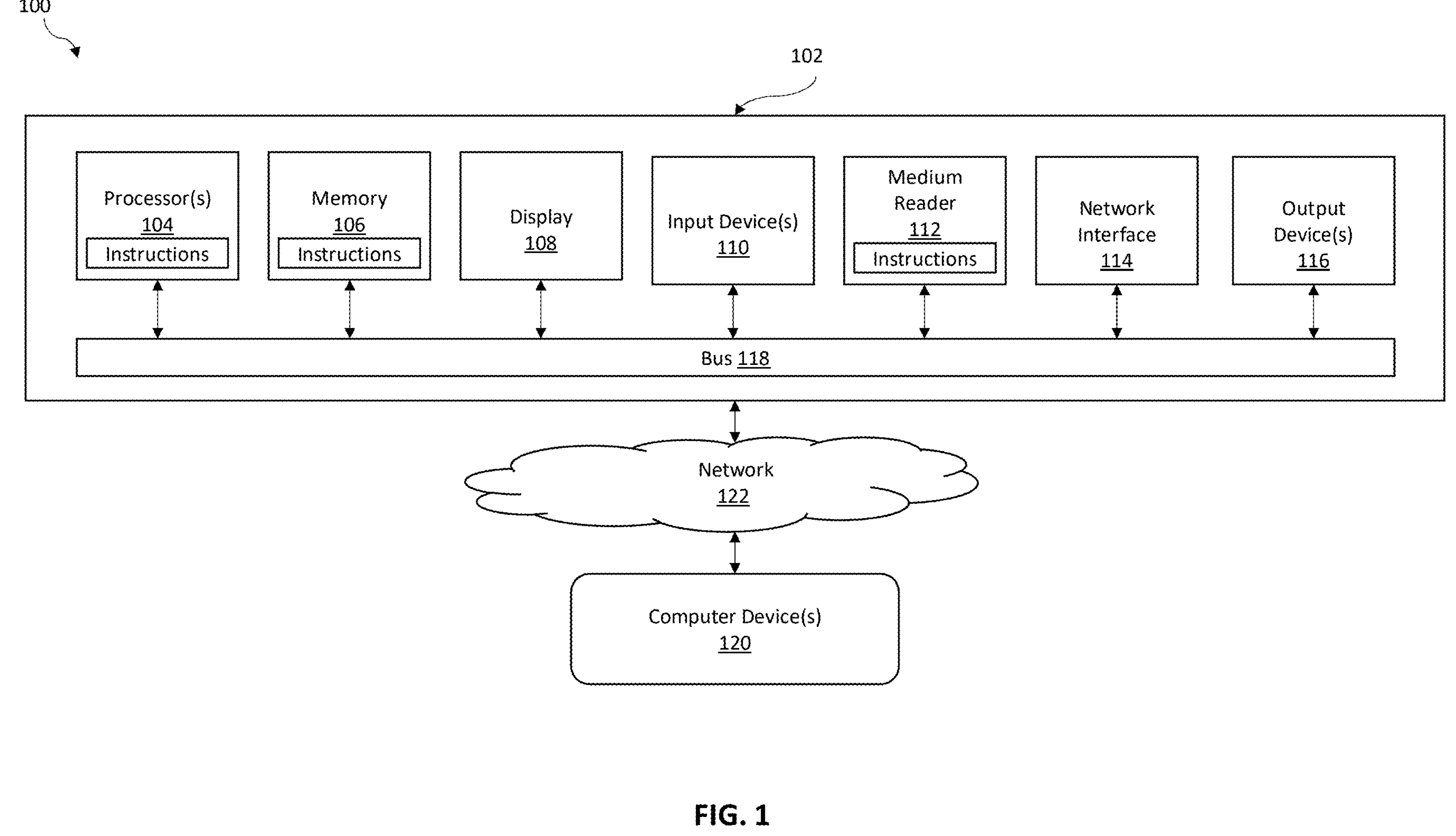
FIG. 1 illustrates an exemplary computer system for optimizing a chunk size for an LLM, in accordance with an exemplary embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to enable other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or"

includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skills in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to enable a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

In the existing method and system, the user manually identifies and retrieves, from the vector database, the most relevant chunk size before inputting it into the large language models (LLMs) to generate an accurate output. This manual identification and retrieval of the most relevant chunk size from the vector database is time consuming and is prone to errors and conflicts. Furthermore, if the user inputs the smaller chunk size of only 10 characters in the LLM, then the output response of LLM will be less accurate. Similarly, if the user inputs the chunk size of 1000 characters, even in that case the output response will again be less accurate. Currently no approach exists to automatically identify and retrieve the most relevant and optimal chunk size during data preparation and/or a model training phase in retrieval augmented generation (RAG) implementations of LLM use cases.

To overcome the above-mentioned problems, the present disclosure provides a method and system for optimizing a chunk size for a large language model (LLM). In the present disclosure, the system first receives, from an entity, at least one from among a set of input data and a set of evaluation metrics for evaluating a performance of the LLM. Next, the system segments the set of input data into a plurality of chunks of a set of predefined chunk sizes. Next, the system processes each of the plurality of chunks of data through the LLM to generate corresponding outputs. Next, the system calculates a respective comprehensive response quality index (CRQI) for each of the plurality of chunks based on the generated corresponding outputs, wherein each respective CRQI is calculated as a weighted combination of the set of evaluation metrics. Thereafter, the system determines an optimal chunk from the plurality of chunks based on each respective calculated CRQI, wherein the chunk that is associated with a largest value of the CRQI is determined as the optimal chunk. This way the system optimizes a chunk size for a large language model (LLM).

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such a cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article about manufacturing and/or machine components. Memories described herein are computer-readable storage mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, and/or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
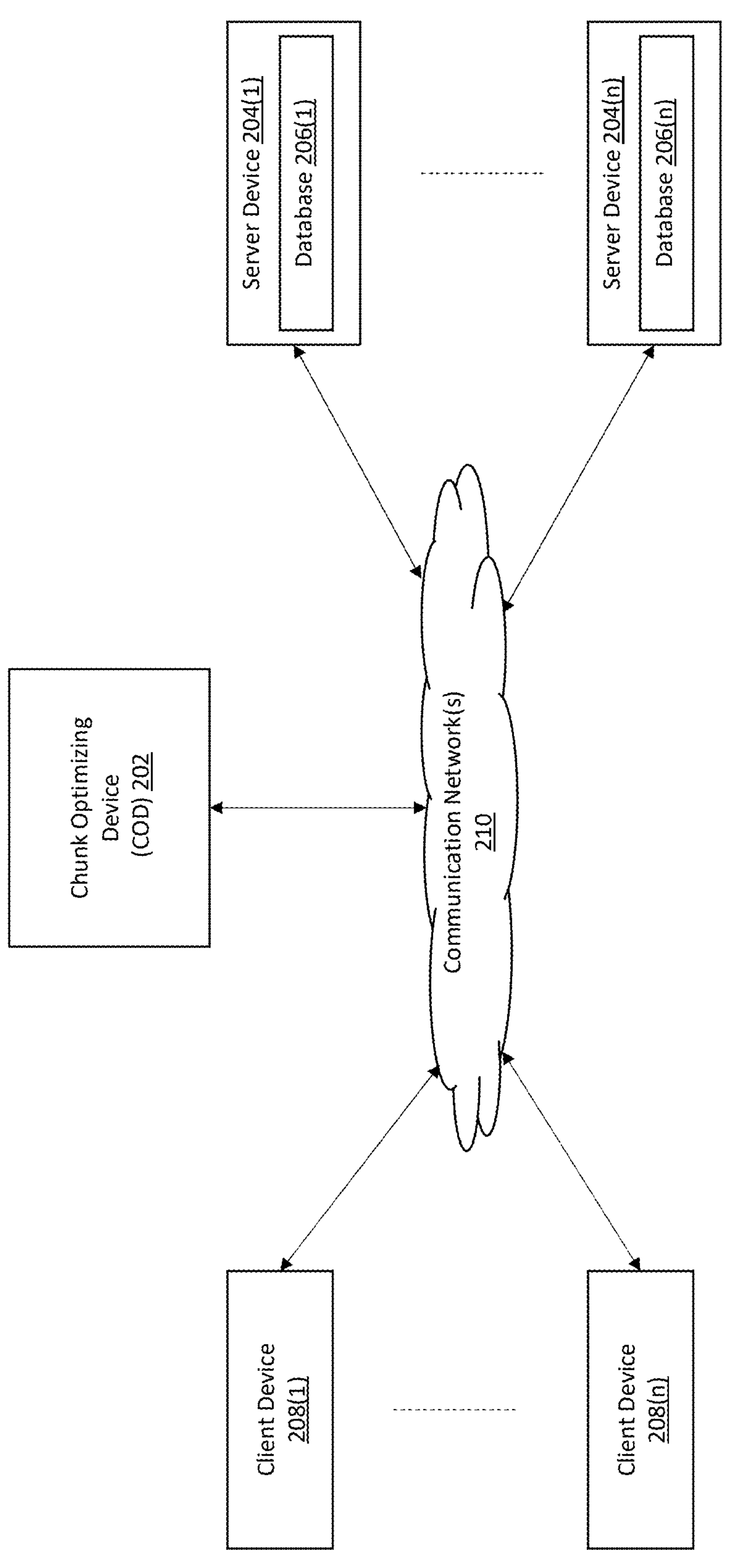
FIG. 2 illustrates an exemplary diagram of a network environment for optimizing a chunk size for an LLM, in accordance with an exemplary embodiment of the present disclosure.

Referring to FIG. 2, a schematic of an exemplary network environment 200 for implementing a method for optimizing a chunk size for a large language model (LLM) is illustrated. In an exemplary implementation, the method is executable on any networked computer platform, such as, for example, a personal computer (PC).

The method for optimizing a chunk size for the LLM may be executed by a chunk optimizing device (COD) 202. The COD 202 may be the same or similar to the computer system 102 as described with respect to FIG. 1. The COD 202 may store one or more applications that may include executable instructions that, when executed by the COD 202, cause the COD 202 to perform desired actions, such as to transmit, receive, or otherwise process various chunk sizes, for example, and to perform other actions described and illustrated below with reference to the figures. The application(s) may be implemented as modules or components of other applications. Further, the application(s) may be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the COD 202 itself, may be located in the virtual server(s) running in a cloud-based computing environment rather than being tied to one or more specific physical network computing devices. Also, the application(s) may be running in one or more virtual machines (VMs) executing on the COD 202. Additionally, in one or more embodiments of this technology, virtual machine(s) running on the COD 202 may be managed or supervised by a hypervisor.

In the network environment 200 of FIG. 2, the COD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the COD 202, such as the network interface 114 of the computer system 102 of FIG. 1, operatively couples and communicates between the COD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the COD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides several advantages including methods, non-transitory computer-readable media, and CODs that efficiently implement the method for optimizing a chunk size for a large language model (LLM).

By way of example only, the communication network(s) 210 may include local area network(s) (LAN(s)) or wide area network(s) (WAN(s)) and can use transmission control protocol/internet protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), public switched telephone networks (PSTNs), ethernet-based packet data networks (PDNs), combinations thereof, and the like.

The COD 202 may be a standalone device or integrated with one or more other devices or apparatuses, such as one or more of the server devices 204(1)-204(*n*), for example. In one particular example, the COD 202 may include or be hosted by one of the server devices 204(1)-204(*n*), and other arrangements are also possible. Moreover, one or more of the devices of the COD 202 may be in a same or a different communication network including one or more public, private, or cloud-based networks.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the COD 202 via the communication network(s) 210 according to the hypertext transfer protocol (HTTP)-based and/or JavaScript object notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases or repositories 206(1)-206(*n*) that are configured to store data associated with the various chunk sizes.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the COD 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary implementation, at one client device 208 is a wireless mobile communication device, e.g., a smartphone.

The client devices 208(1)-208(*n*) may run interface applications, such as standard web browsers or standalone client applications, which may provide an interface to communicate with the COD 202 via the communication network(s) 210 in order to communicate user requests and information. The client devices 208(1)-208(*n*) may further include, among other features, a display device, such as a display unit or touchscreen, and/or an input device, such as a keyboard, for example.

Although the exemplary network environment 200 with the COD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the COD 202, the server devices 204(1)-204(*n*), or the client devices 208(1)-208(*n*), for example, may be configured to operate as virtual instances on the same physical machine. In other words, one or more of the COD 202, the server devices 204(1)-204(*n*), or the client devices 208(1)-208(*n*) may operate on the same physical device rather than as separate devices communicating through communication network(s) 210. Additionally, there may be more or fewer CODs 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, may also be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, packet data networks (PDNs), the Internet, intranets, and combinations thereof.

Figure 3:
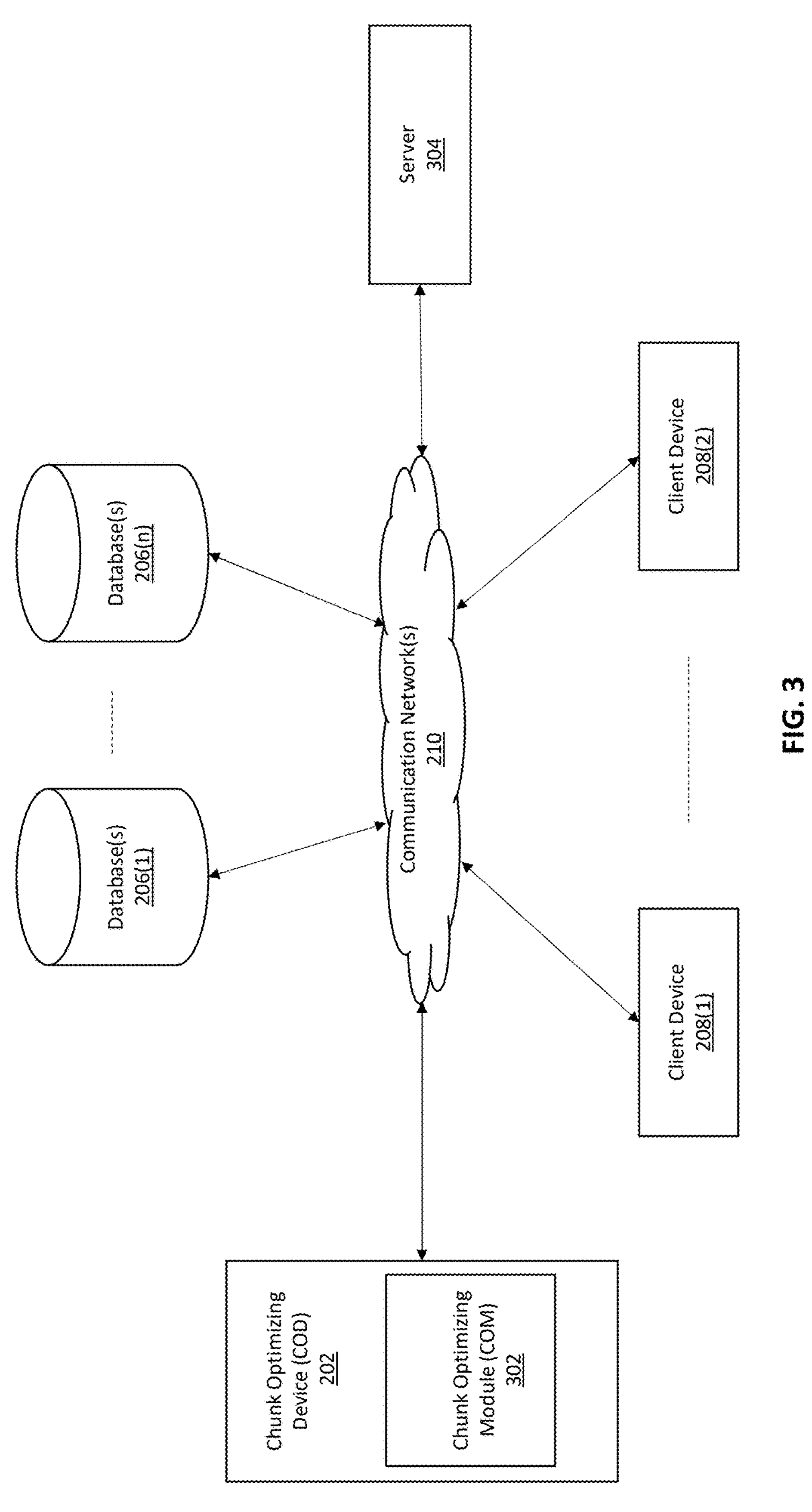
FIG. 3 illustrates an exemplary system for optimizing a chunk size for an LLM, in accordance with an exemplary embodiment of the present disclosure.

FIG. 3 illustrates an exemplary system for implementing a method for recommending an optimal chunk size to automate tasks, in accordance with an exemplary embodiment. As illustrated in FIG. 3, the system 300 may include a chunk optimizing device (COD) 202 within which a chunk optimizing (CO) module (COM) 302 is embedded, a server 304, a database(s) 206(1) . . . 206(*n*), a plurality of client devices 208(1) . . . 208(2), and a communication network(s) 210.

According to exemplary embodiments, the system 300 may comprise the chunk optimizing device (COD) 202 including the COM 302, which may be connected to the server 304 and the database(s) 206(1) 206(*n*) via the communication network(s) 210, but the disclosure is not limited thereto. The COD 202 may also be connected to the plurality of client devices 208(1) . . . 208(2) via the communication network(s) 210, but the disclosure is not limited thereto. The database(s) 206(1) . . . 206(*n*) may include a rule database.

In an embodiment, the COD 202 is described and shown in FIG. 3 as including the COM 302, although it may include other rules, policies, modules, databases, or applications, for example. As will be described below, the COM 302 is configured to carry out a method for optimizing a chunk size for a large language model (LLM).

An exemplary system 300 for implementing a mechanism to provide the optimizing chunk size for a large language model (LLM) by utilizing the network environment of FIG. 2 is shown as being executed in FIG. 3. Specifically, a first client device 208(1) and a second client device 208(2) are illustrated as being in communication with the COD 202. In this regard, the first client device 208(1) and the second client device 208(2) may be "clients" of the COD 202 and are described herein as such. Nevertheless, it is to be known and understood that the first client device 208(1) and/or the second client device 208(2) need not necessarily be "clients" of the COD 202, or any entity described in association therewith herein. Any additional or alternative relationship may exist between either or both of the first client device 208(1) and the second client device 208(2) and the COD 202, or no relationship may exist.

Further, the COD 202 is illustrated as being able to access one or more databases 206(1) . . . 206(*n*). The COM 302 may be configured to access these repositories/databases for implementing a method for optimizing a chunk size for a large language model (LLM). In some embodiment, the server 304 may be the same or equivalent to the server device 204 as illustrated in FIG. 2.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the COD 202 via broadband or cellular communication. These embodiments are merely exemplary and are not limiting or exhaustive.

Figure 4:
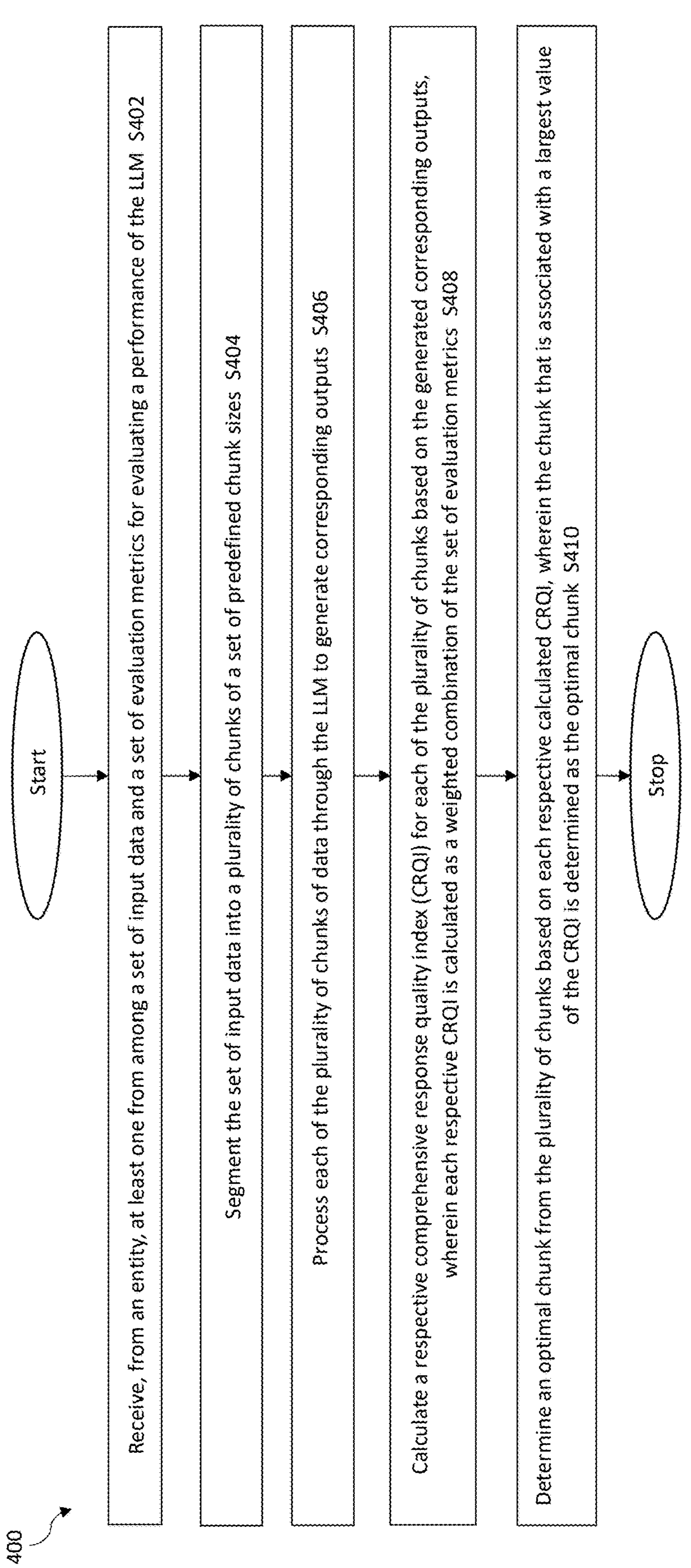
FIG. 4 illustrates an exemplary method flow diagram for optimizing a chunk size for an LLM, in accordance with an exemplary embodiment of the present disclosure.

Referring to FIG. 4, an exemplary method 400 is shown for optimizing a chunk size for a large language model (LLM), in accordance with an exemplary implementation.

At step S402, the method 400 includes receiving, by the at least one processor 104 from an entity, at least one from among a set of input data and a set of evaluation metrics for evaluating a performance of the LLM. In an exemplary implementation, the set of evaluation metrics includes at least one from among an accuracy metric, a robustness metric, a coherence and consistency metric, a response time metric, a faithfulness metric, and a factuality metric. In an exemplary implementation, each metric included in the set of evaluation metrics is normalized to a score between zero (0) and one (1) for calculating a respective comprehensive response quality index (CRQI).

In an exemplary embodiment, the set of evaluation metrics may further include, but is not limited to, a perplexity score, a truthfulness and reliability metric, a comprehension metric, a coherence and consistency metric, a diversity and creativity metric, a fairness metric, a bias metric, and a customizability metric.

The set of input data refers to any text or data source that is provided to the LLM to generate responses or predictions. The set of input data may be unstructured, such as raw text extracted from documents, articles, webpages, or structured data, such as tables, labeled datasets, or any other organized form of information that can be processed by the LLM. For example, in a retrieval-augmented generation (RAG) system, the set of input data could include user queries, text segments from a knowledge base, and/or documents retrieved in response to a query.

The set of evaluation metrics may include parameters such as an accuracy metric, a robustness metric, a coherence and consistency metric, a response time metric, a faithfulness metric, and a factuality metric. For example, the accuracy metric could measure how correctly the LLM provides a response to a given query, while the response time metric might assess the speed with which the LLM generates a response.

The entity refers to the system or user responsible for providing the set of input data. The entity may include an administrator configuring a model for training, a system user initiating a query for real-time response, and/or a researcher optimizing the LLM for specific tasks. The at least one processor 104 receives the set of input data to generate the comprehensive response quality index (CRQI), which helps determine the optimal chunk size based on how well the LLM performs.

At step S404, the method 400 includes segmenting, by the at least one processor 104, the set of input data into a plurality of chunks of a set of predefined chunk sizes. In an exemplary implementation, the set of predefined chunk sizes includes a range of token sizes, the range of token sizes including but not limited to 256 tokens, 512 tokens, 1024 tokens, and 2048 tokens.

The set of predefined chunk sizes refers to a range of token sizes or units of data that are selected based on system parameters or user preferences. Common predefined chunk sizes may include a range of token sizes, including but not limited to 256, 512, 1024, or 2048 tokens. The set of predefined sizes may be chosen based on the set of input data and performance requirements of the LLM in a given use case. For example, a chunk size of 256 tokens might be suitable for short text inputs, while a larger chunk size, such as 1024 tokens, could be more appropriate for processing lengthy documents or complex paragraphs.

The at least one processor 104 divides the set of input data into the plurality of chunks, and each chunk of the plurality of chunks corresponds to one of the predefined sizes. For example, if the set of input data is a 5,000-word document, the at least one processor 104 will divide the document into smaller chunks, each including a predefined number of tokens, such as 512 tokens per chunk. Each chunk is then processed separately by the LLM, allowing the LLM model to generate responses for each segment of data.

This segmentation facilitates applications where large volumes of text or data need to be processed quickly and accurately. For example, in a retrieval-augmented generation (RAG) system, where large amounts of data are retrieved in response to user queries, the at least one processor 104 must break down the data sets into smaller, manageable chunks before sending them to the LLM to avoid the LLM model from being overloaded by too much input data at once, which could lead to slower response times or decreased accuracy.

Moreover, segmenting input data into the plurality of chunks of predefined sizes helps in optimizing usage of resources, such as memory and processing power, during LLM execution. Processing smaller chunks allows the system to utilize computational resources more effectively, thereby enabling the LLM to perform optimally across different use cases, such as real-time question answering, text summarization, and/or language translation.

At step S406, the method 400 includes processing, by the at least one processor 104, each of the plurality of chunks of data through the LLM to generate corresponding outputs.

Each respective chunk of data is independently fed into the LLM model, which processes the respective chunk to produce a relevant output based on the model's trained capabilities, such as generating text, answering questions, summarizing information, and/or making predictions.

The processing refers to running the LLM model's complex neural network model on each individual chunk. The LLM model refers to an advanced machine learning model trained in vast amounts of textual data. The LLM model applies its language understanding capabilities to interpret and generate appropriate responses for each chunk. For example, if the input chunk consists of a paragraph from a legal document, the LLM model would process the chunk to either summarize the text, provide an interpretation, and/or answer a query based on the information contained in that chunk.

The corresponding output means that for each chunk of data, the LLM model produces an output that is specific to the content of the chunk. The examples of the corresponding output could include the generation of natural language text, numerical predictions, classification labels, and/or other forms of output depending on the current task being performed. For example, in a chatbot application, each chunk of a user's query or conversation might be processed to produce a response, and the outputs from each chunk would then be compiled to form a coherent and accurate answer.

In the RAG system, where the LLM model is tasked with retrieving and generating responses based on a large dataset, processing each chunk of input data enables even complex and lengthy inputs to be handled efficiently. For example, if the set of input data consists of multiple text segments retrieved from a database in response to a user query, the at least one processor 104 would process each of these segments (e.g., chunks) through the LLM model, which would generate corresponding outputs for each segment such as summaries, key points, and/or answers.

At step S408, the method 400 includes calculating, by the at least one processor 104, a respective comprehensive response quality index (CRQI) for each of the plurality of chunks based on the generated corresponding outputs, wherein each respective CRQI is calculated as a weighted combination of the set of evaluation metrics. In an exemplary implementation, weightages assigned to the set of evaluation metrics are adjustable based on at least one from among a set of user preferences and a set of predefined criteria.

The CRQI refers to a key metric used to evaluate and quantify overall quality of the corresponding output produced by the LLM for each individual chunk of input data. The CRQI index provides a holistic measure that takes into account various performance aspects of the LLM for a specific application or use case.

The set of evaluation metrics refers to the predefined parameters that assess different dimensions of the LLM's performance. In typical scenarios, the set of evaluation metrics may include, but is not limited to, an accuracy metric, a coherence and consistency metric, a robustness metric, a response time metric, a faithfulness metric, and a factuality metric. Each of the set of evaluation metrics evaluates a specific characteristic of the LLM's output for a given chunk.

Accuracy measures how closely the LLM's output matches the correct or expected result. The coherence and consistency metric evaluates whether the LLM provides uniform and stable outputs across similar inputs. The robustness metric assesses how well the model handles variations in the input data, such as noise or incomplete data. The response time metric measures the speed with which the LLM generates its output, which is particularly important in real-time applications. The faithfulness metric checks whether the generated output stays true to the provided input without introducing unrelated or misleading information. The factuality metric determines whether the information provided by the LLM is factually correct, especially critical in fields like healthcare, finance, or legal applications. The perplexity score evaluates how well an LLM model predicts a chunk size. A lower perplexity score indicates better predictive performance. The comprehension metric determines the LLM model's ability to understand the input chunk size. The fairness metric refers to the LLM's ability of correcting and eliminating algorithmic bias (of race and ethnicity, gender, sexual orientation, disability, and class). An ideal fair LLM model would not discriminate based on attributes such as gender, race or age. The bias metric in LLM is determined by checking whether some aspects of a dataset are given more weightage and/or representation than others.

To compute each respective CRQI, the at least one processor 104 assigns a specific weightage to each of the set of evaluation metrics based on their relative importance for the specific use case. For example, in an application where response time is critical, such as a live chat system, the weightage assigned to the "response time" metric might be higher than the weightage assigned to the "factuality" metric. Conversely, in a legal document review system, the "factuality" metric and the "accuracy" metric may be given greater weightage such that the outputs are legally sound and reliable.

The weighted combination of the set of evaluation metrics is used to calculate the respective CRQI for each chunk. The formula for calculating the CRQI may be $CRQI=\alpha*A+\beta*R+\gamma*C+\delta*1/Re+\epsilon\cdot Fi+\zeta*Fa$, wherein $\alpha$, $\beta$, $\delta$, $\epsilon$, $\zeta$ represent the weightages assigned to each evaluation metric, reflecting their importance in the overall quality assessment. in an embodiment, each metric's value is normalized to a score between zero (0) and one (1), where 1 represents the best possible performance for that metric.

In an exemplary aspect, there may be various types of the set of evaluation metrics that are available for users to select based on their preferences. The types may include a quality type metric, a performance type metric, and a trust and ethical consideration type metric.

In an exemplary aspect, for the quality type metric, a weightage of the set of evaluation metrics may include:

Accuracy: 33.98113794914797

Robustness: 8.009431025426009

Coherence and consistency: 33.981137949147964

Response Time: 8.009431025426018

Faithfulness: 8.009431025426018

Factuality: 8.009431025426018

$$CRQI \text{ score} = (.3398*.67+.008*.75+.3398*1+.08*1/1+.08*.67+.08*.75)$$

In an exemplary aspect, for the performance type metric, a weightage of the set of evaluation metrics may include:

Accuracy: 8.009431025426018
Robustness: 33.98113794914797
Coherence and consistency: 8.009431025426018
Response Time: 33.981137949147964
Faithfulness: 8.009431025426018
Factuality: 8.009431025426018

$$CRQI \text{ score} = (.08*.67+.3398*.75+.08*1+.3398*1/1+.08*.67+.08*.75)$$

In an exemplary aspect, for the trust and ethical consideration type metric, a weightage of the set of evaluation metrics may include:

Accuracy: 8.009431025426018
Robustness: 8.009431025426018
Coherence and consistency: 8.009431025426018
Response Time: 8.009431025426018
Faithfulness: 33.98113794914797
Factuality: 33.98113794914797

$$CRQI \text{ score} = (.08*.67+.08*.75+.08*1+.08*1/1+.3398*.67+.3398*.75)$$

At step S410, the method 400 includes determining, by the at least one processor 104, an optimal chunk from the plurality of chunks based on each respective calculated CRQI, wherein the chunk that is associated with a largest value of the CRQI is determined as the optimal chunk. The optimal chunk refers to the data chunk that yields the highest overall performance based on the set of evaluation metrics captured in the CRQI. As each chunk of the set of input data is processed through the LLM, its corresponding CRQI is computed, which provides a measure of the model's performance for that particular chunk size. The CRQI considers multiple factors, such as accuracy, coherence and consistency, response time, robustness, faithfulness, factuality, perplexity score, truthfulness and reliability, comprehension, coherence and consistency, diversity and creativity, fairness, bias, customizability, and weightages according to the system's requirements or user preferences.

The at least one processor 104 may compare the CRQI values across the plurality of chunks, which were created by segmenting the input data into predefined chunk sizes, such as a range of token sizes, including but not limited to 256, 512, 1024, and 2048 tokens. The chunk with the largest CRQI value is selected as the optimal chunk. The chunk size associated with the highest CRQI is deemed to be the most suitable for processing, as it offers the best balance of performance across the set of evaluation metrics.

For example, in the RAG system designed for legal document analysis, the at least one processor 104 may segment the input data (e.g., a lengthy legal document) into the plurality of chunks of different chunk sizes and then compute the respective CRQI for each chunk. A chunk size of 512 tokens may achieve a higher CRQI as compared with other chunk sizes because it strikes the best balance between accuracy (i.e., correct interpretation of legal terminology), response time (i.e., speed of processing), and factuality (i.e., faithful extraction of legal clauses). As a result, the 512-token chunk would be selected as the optimal chunk size for that document.

Figure 5:
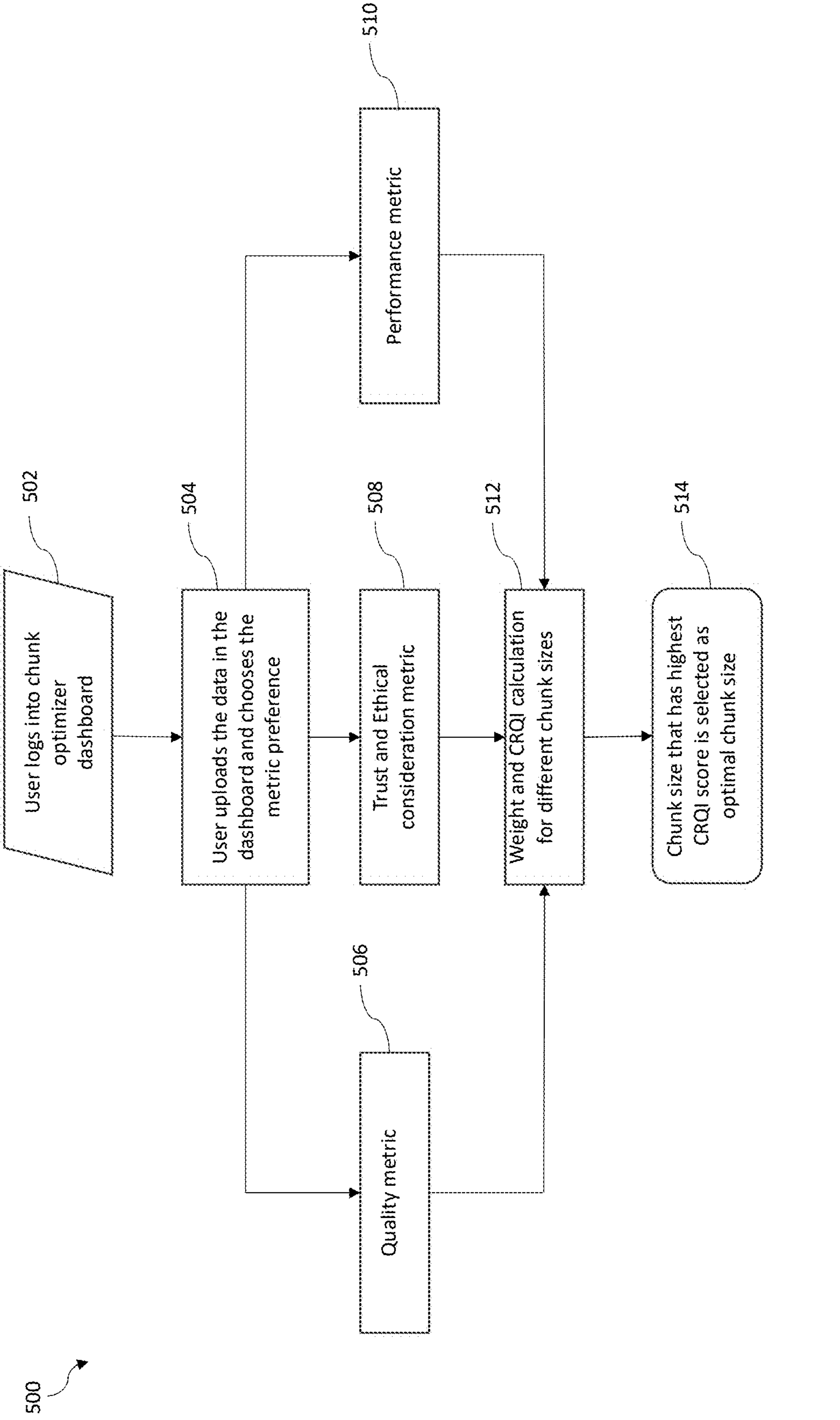
FIG. 5 illustrates an exemplary process flow diagram for optimizing a chunk size for an LLM, in accordance with an exemplary embodiment of the present disclosure.

FIG. 5 illustrates an exemplary process flow diagram for optimizing a chunk size for an LLM, in accordance with an exemplary embodiment of the present disclosure.

As shown in FIG. 5, the process 500 begins following a need for optimizing a chunk size for an LLM. The process 500 is implemented by at least one processor 104.

In accordance with various embodiments, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

At 502, the process 500 includes the user logging onto a chunk optimizing dashboard (hereinafter also referred to as dashboard). The dashboard can be displayed on a display unit. The display unit could be any user interface, such as a computer screen, mobile device, or a control panel, which is capable of rendering the selected optimal chunk size and related information.

At 504, the process 500 includes the user uploading the data in the dashboard. The uploaded data can include at least one of text data, documents, and/or other types of information that need to be processed by the LLM. After uploading, the dashboard may provide an option to the user for selecting a type of metrics. The types of metrics includes a quality type metric 506, a performance type metric 510, and a trust and ethical consideration type metric 508. Once the set of input data is received, it is processed by the at least one processor 104. The at least one processor 104 is responsible for dividing the input data into the plurality of chunks of predefined chunk sizes. These sizes could include, for example, 256 tokens, 512 tokens, 1024 tokens, or 2048 tokens, though the system could be configured to work with other chunk sizes as well.

At 512, the process 500 includes determining the respective weightage and a respective comprehensive response quality index (CRQI) for each of various chunk sizes. More details about the determining the weightage and CRQI are further provided, for example, at step S408 of FIG. 4, or CRQI module 608 of FIG. 6.

Thereafter, at 514, the process 500 includes selecting the chunk size with the highest CRQI score as the optimal chunk size. The selected CRQI score may be displayed on the display unit.

The display of the optimal chunk can also include comparative data, showing the CRQI scores of other chunk sizes that were evaluated during the optimization process. For example, if chunk sizes of 256, 512, 1024, and 2048 tokens were considered, the display could present a comparative chart or table that shows the CRQI for each chunk size, with the optimal chunk clearly highlighted. This helps users or system administrators understand the trade-offs between different chunk sizes and enables them to make informed decisions if further tuning is required.

In an exemplary implementation, the display unit might be interactive, allowing users to adjust parameters such as the weightages assigned to each evaluation metric or to rerun the optimization with different input data. For example, in an AI-powered content generation tool, the user might see the optimal chunk size displayed alongside an option to tweak the importance of response time or accuracy, thereby recalculating the CRQI and selecting a new optimal chunk size based on the updated parameters.

Figure 6:
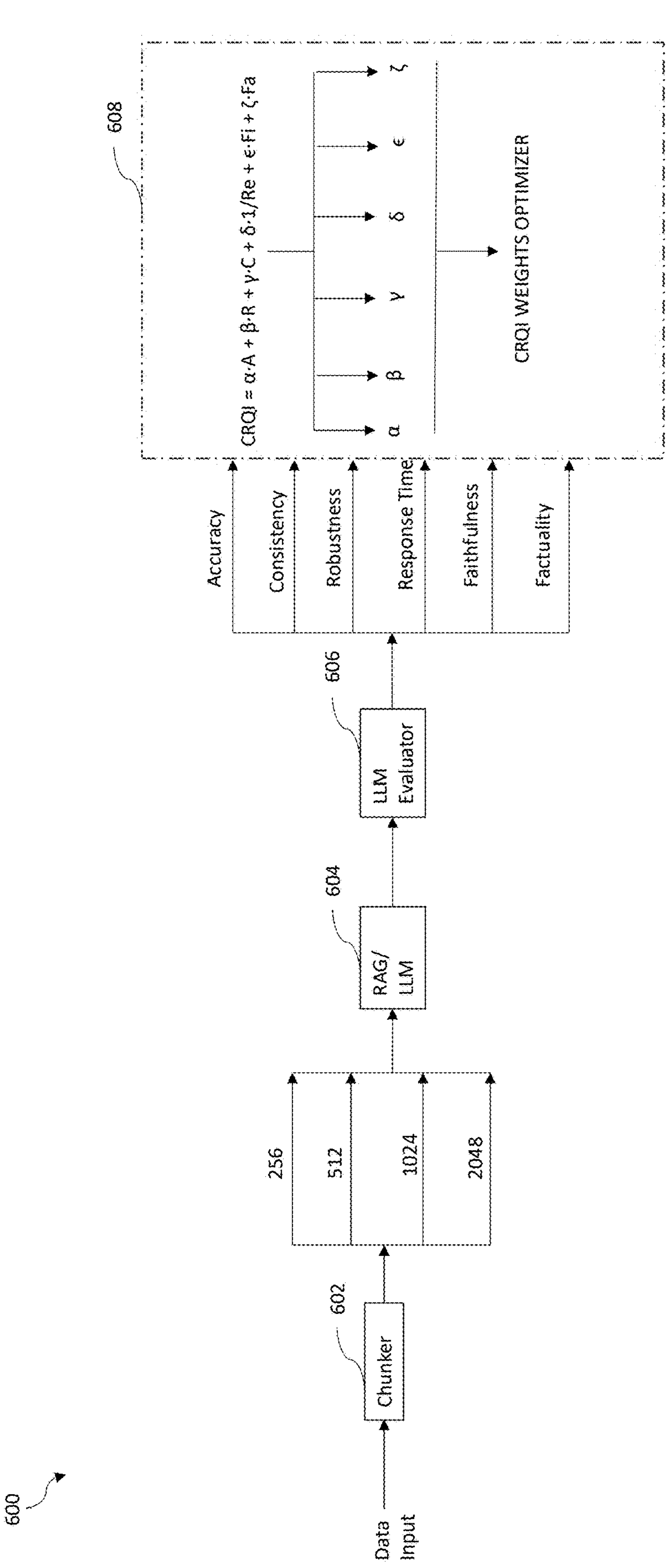
FIG. 6 illustrates an exemplary architecture of a system for optimizing a chunk size for an LLM, in accordance with an embodiment of the present disclosure.

FIG. 6 illustrates an exemplary architecture 600 of a system for optimizing a chunk size for an LLM, in accordance with an embodiment of the present disclosure.

The process begins with receiving the set of input data, which may include text data, documents, or other types of information that need to be processed by the LLM. The set of input data is the raw content that the system will use to test different chunk sizes and evaluate the performance of the LLM based on the plurality of chunks.

Once the set of input data is received, it is processed by a chunker 602. The chunker 602 is responsible for dividing the input data into the plurality of chunks of predefined chunk sizes. These sizes could include, for example, 256 tokens, 512 tokens, 1024 tokens, or 2048 tokens, though the system could be configured to work with other chunk sizes as well.

The next step involves passing the chunked data to the LLM 604. The LLM 604 processes each chunk of data to generate corresponding outputs. During this step, the LLM's ability to handle different chunk sizes is evaluated. For example, smaller chunks may be processed more quickly but could lead to reduced accuracy or consistency, while larger chunks might offer more context to the LLM but take longer time to process. The LLM's output for each chunk size will form the basis of the set of evaluation metrics.

The LLM Evaluator 606 is responsible for assessing the output generated by the LLM based on the set of evaluation metrics. The set of evaluation metrics may include, but not be limited only to, an accuracy metric, a coherence and consistency metric, a robustness metric, a response time metric, a faithfulness metric, and/or a factuality metric. Accuracy corresponds to how correctly the LLM generates a response based on the input data. Consistency corresponds to whether the LLM produces stable and coherent results across similar queries. Robustness corresponds to the LLM's ability to maintain performance despite variations in the input data. Response Time corresponds to the speed with which the LLM generates its output. Faithfulness corresponds to how closely the generated output adheres to factual or intended information. Factuality corresponds to whether the output contains accurate and factually correct information. The set of evaluation metrics facilitates in determining the overall performance of the LLM when processing different chunk sizes. The LLM evaluator 606 collects the set of evaluation metrics and prepares them for further analysis. Perplexity score evaluates how well an LLM model predicts a chunk size. A lower perplexity score indicates better predictive performance. Comprehension determines the LLM model's ability to understand the input chunk size. Fairness refers to LLMs ability of correcting and eliminating algorithmic bias (of race and ethnicity, gender, sexual orientation, disability, and class). An ideal fair LLM model would not discriminate based on attributes, including but not limited to, such as gender, race or age. Bias in LLM is determined by checking whether some aspects of a dataset are given more weightage and/or representation than others.

Thereafter, at CRQI module 608, the CRQI is calculated. The CRQI is a composite score that combines all the set of evaluation metrics based on assigned weightages. In an embodiment, the $CRQI=\alpha A+\beta R+\gamma C+\delta*1/S+\varepsilon F+\zeta Fa$, where:

A is accuracy,

R is robustness,

C is coherence and consistency,

S is response time,

F is faithfulness, and

Fa is factuality.

Each metric is assigned a weightage represented by the Greek letters $\alpha$, $\beta$, $\gamma$, $\delta$, $\varepsilon$, and $\zeta$. The weightages determine the importance of each metric in the final CRQI score. For instance, in certain applications, the user may prioritize accuracy $\alpha$ over response time $\delta$, so accuracy would be given a higher weightage in the CRQI calculation.

The Weightages Optimizer allows for adjusting these weightages based on user preferences or specific application needs. Once the weightages are assigned and the CRQI is calculated for each chunk size, the chunk size with the highest CRQI score is selected as the optimal chunk size.

The present disclosure provides numerous advantages as outlined below. The present disclosure provides a system and method for optimizing chunk sizes for large language models (LLMs) to enhance performance, efficiency, and accuracy in data processing. The present disclosure facilitates the automatic determination of the optimal chunk size by evaluating various predefined metrics such as accuracy, coherence and consistency, robustness, response time, faithfulness, factuality, perplexity score, truthfulness and reliability, comprehension, diversity and creativity, fairness, bias and customizability. By leveraging a chunker module, a comprehensive response quality index (CRQI) calculator, and a performance evaluator, the present disclosure enables that the LLM operates with the most effective chunk size based on specific user preferences or predefined criteria. The present disclosure also provides a solution for dynamically adjusting the weightages assigned to different evaluation metrics, enabling the system to adapt to varying operational requirements or user-defined preferences. By automating the chunk size selection process, the present disclosure reduces the need for continuous manual intervention and enables the LLM to quickly adjust to new data inputs and evolving performance requirements. Moreover, the present disclosure enables organizations to maintain consistent performance across different applications by using a centralized evaluation and optimization framework. The system provides customizable metric weighting options, enabling users to prioritize performance factors based on their requirements. Furthermore, the present disclosure enhances overall system performance by seamlessly integrating into existing LLM workflows, minimizing the need for extensive manual configuration and debugging. The modular architecture of the system supports easy scalability, making it suitable for a variety of LLM applications, from small-scale projects to enterprise-level deployments. The present disclosure thus drives better operational efficiency, reduces the cost of managing LLM performance such that the models are always operating at their optimal chunk size for any given task.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor 104 or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for optimizing a chunk size for a large language model (LLM) is disclosed. The instructions include executable code which, when executed by a processor, may cause the processor to receive, from an entity, at least one from among a set of input data and a set of evaluation metrics for evaluating a performance of the LLM. The instructions include executable code which, when executed by a processor, may cause the processor to segment the set of input data into a plurality of chunks of a set of predefined chunk sizes. The instructions include executable code which, when executed by a processor, may cause the processor to process each of the plurality of chunks of data through the LLM to generate corresponding outputs. The instructions include executable code which, when executed by a processor, may cause the processor to calculate a respective comprehensive response quality index (CRQI) for each of the plurality of chunks based on the generated corresponding outputs, wherein each respective CRQI is calculated as a weighted combination of the set of evaluation metrics. The instructions include executable code which, when executed by a processor, may cause the processor to determine an optimal chunk from the plurality of chunks based on the each respective calculated CRQI, wherein the chunk that is associated with a largest value of the CRQI is determined as the optimal chunk.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to enable a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing detailed description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

We claim:

1. A method for optimizing a chunk size for a large language model (LLM), the method being implemented by at least one processor, the method comprising:

receiving, by the at least one processor from an entity, at least one from among a set of input data and a set of evaluation metrics for evaluating a performance of the LLM;

segmenting, by the at least one processor, the set of input data into a plurality of chunks of a set of predefined chunk sizes;

processing, by the at least one processor, each of the plurality of chunks of data through the LLM to generate corresponding outputs;

calculating, by the at least one processor, a respective comprehensive response quality index (CRQI) for each of the plurality of chunks based on the generated corresponding outputs, wherein each respective CRQI is calculated as a weighted combination of the set of evaluation metrics; and determining, by the at least one processor, an optimal chunk from among the plurality of chunks based on each respective calculated CRQI, wherein the respective chunk that is associated with a largest value of the CRQI is determined as the optimal chunk, wherein the set of evaluation metrics comprises each of an accuracy metric, a robustness metric, a coherence and consistency metric, a response time metric, a faithfulness metric, and a factuality metric.

2. The method as claimed in claim 1, further comprising displaying, by the at least one processor, the optimal chunk on a display unit.

3. The method as claimed in claim 1, wherein the set of predefined chunk sizes comprises a range of token sizes, the range of token sizes including 256 tokens, 512 tokens, 1024 tokens, and 2048 tokens.

4. The method as claimed in claim 1, wherein a weightage assigned to the set of evaluation metrics is adjustable based on at least one from among a set of user preferences and a set of predefined criteria.

5. The method as claimed in claim 1, wherein each metric included in the set of evaluation metrics is normalized to a score between zero (0) and one (1) for the calculating of the CRQI.

6. A computing device configured for optimizing a chunk size for a large language model (LLM), the computing device comprising:

at least one processor;

a memory; and a communication interface coupled to each of the processor and the memory, wherein the processor is configured to:

receive, from an entity, at least one from among a set of input data and a set of evaluation metrics for evaluating a performance of the LLM;

segment the set of input data into a plurality of chunks of a set of predefined chunk sizes;

process each of the plurality of chunks of data through the LLM to generate corresponding outputs;

calculate a respective comprehensive response quality index (CRQI) for each of the plurality of chunks based on the generated corresponding outputs, wherein each respective CRQI is calculated as a weighted combination of the set of evaluation metrics; and determine an optimal chunk from among the plurality of chunks based on each respective calculated CRQI, wherein the respective chunk that is associated with a largest value of the CRQI is determined as the optimal chunk, wherein the set of evaluation metrics comprises each of an accuracy metric, a robustness metric, a coherence and consistency metric, a response time metric, a faithfulness metric, and a factuality metric.

7. The computing device as claimed in claim 6, wherein the processor is further configured to display the optimal chunk on a display unit.

8. The computing device as claimed in claim 6, wherein the set of predefined chunk sizes comprises a range of token sizes, the range of token sizes including 256 tokens, 512 tokens, 1024 tokens, and 2048 tokens.

9. The computing device as claimed in claim 6, wherein a weightage assigned to the set of evaluation metrics are adjustable based on at least one from among a set of user preferences and a set of predefined criteria.

10. The computing device as claimed in claim 6, wherein each respective metric included in the set of evaluation metrics is normalized to a score between zero (0) and one (1) for the calculation of the CRQI.

11. A non-transitory computer readable storage medium storing instructions for optimizing a chunk size for a large language model (LLM), the storage medium comprising executable code which, when executed by a processor, causes the processor to:

receive, from an entity, at least one from among a set of input data and a set of evaluation metrics for evaluating a performance of the LLM;

segment the set of input data into a plurality of chunks of a set of predefined chunk sizes;

process each of the plurality of chunks of data through the LLM to generate corresponding outputs;

calculate a respective comprehensive response quality index (CRQI) for each of the plurality of chunks based on the generated corresponding outputs, wherein each respective CRQI is calculated as a weighted combination of the set of evaluation metrics; and determine an optimal chunk from among the plurality of chunks based on each respective calculated CRQI, wherein the respective chunk that is associated with a largest value of the CRQI is determined as the optimal chunk, wherein the set of evaluation metrics comprises each of an accuracy metric, a robustness metric, a coherence and consistency metric, a response time metric, a faithfulness metric, and a factuality metric.

12. The storage medium as claimed in claim 11, wherein when executed by the processor, the executable code further causes the processor to display the optimal chunk on a display unit.

13. The storage medium as claimed in claim 11, wherein the set of predefined chunk sizes comprises a range of token sizes, the range of token sizes including 256 tokens, 512 tokens, 1024 tokens, and 2048 tokens.

14. The storage medium as claimed in claim 11, wherein a weightage assigned to the set of evaluation metrics are adjustable based on at least one from among a set of user preferences and a set of predefined criteria.

15. The storage medium as claimed in claim 11, wherein each metric included in the set of evaluation metrics is normalized to a score between zero (0) and one (1) for the calculation of the CRQI.

* * * * *